UNITED STATES PATENT OFFICE.

FREDERICK D. HARPER, OF EVERETT, MASSACHUSETTS.

PROCESS OF PRODUCING MANGANESE DIOXID.

1,157,530.  Specification of Letters Patent.  Patented Oct. 19, 1915.

No Drawing.  Application filed December 5, 1913. Serial No. 804,874.

*To all whom it may concern:*

Be it known that I, FREDERICK D. HARPER, a citizen of the United States, residing at Everett, in the county of Middlesex and State of Massachusetts, have invented certain new and useful Improvements in Processes of Producing Manganese Dioxid, of which the following is a specification.

My invention relates to the adequate production in bulk for commercial purposes of a heavy powdered artificially precipitated manganese dioxid which shall be substantially equal in density to the native mineral manganese dioxid, and which shall be free from the impurities found in the native minerals.

My invention is for a process of increasing the density of precipitated manganese dioxid until its specific gravity is substantially equal to that of the native mineral manganese dioxid, and obtaining the precipitated manganese dioxid in a state wholly free from any impurity with which the native mineral is always associated. The native mineral manganese dioxid is treated for commercial purposes by grinding it to a rather coarse powder which then consists of from 85 to 90 per cent. of pure manganese dioxid, the remaining 10 or 15 per cent. of impurity being mainly silica or silicious earths, which impurity cannot be economically removed and it therefore remains as a deleterious ingredient in commercial powdered native manganese dioxid.

The artificially precipitated manganese dioxid which may be obtained by well known and ordinary chemical methods, settles down on the filter after precipitation as a flocculent mass of low specific gravity, which when dried becomes a fine black powder whose density is only about one-seventh of that of the powdered native manganese dioxid, for which reason its application to and use in some forms of industry is interfered with and greatly lessened.

In order to give this artificially precipitated manganese dioxid the desired density equal to that of the native mineral, the precipitate, after drying, is collected in the form of a black powder which is then put in a mold after having been moistened with any suitable binder, such as flour paste, in cases where it may be found desirable to give added cohesiveness to the mass; it is then subjected to a mechanical pressure, hydraulic or otherwise, to the degree necessary for producing a solid mineral mass whose density shall be not less than seven times as great as that of the powder before being subjected to pressure; this requisite pressure is found by experiment to be from 16 to 20 tons to the square inch.

After being subjected to pressure substantially in the manner described, the hardened mass of artificially precipitated manganese dioxid is removed from the mold in which it was incased and is ground up by suitable mechanical means; it is then in the form of a black powder whose density has been increased about 700 per cent. over that of the same powder before being subjected to pressure, and is then of substantially equal density with the powdered native manganese dioxid over which it has the sought for advantage of being free from the impurity of 10 or 15 per cent. of silica, or other foreign element.

The artificially prepared powder is then suitable in form and density for any desired use in the industrial arts.

Having thus described my invention I claim.

The method of treating precipitated manganese dioxid for the purpose set forth, which consists in first subjecting the dried precipitated manganese dioxid in a mold to a pressure sufficient to give to the product substantially the same density as that of the native mineral, and then grinding the same.

In testimony whereof I have affixed my signature, in presence of two witnesses.

FRED. D. HARPER.

Witnesses:
CLARENCE S. WARD,
CHARLES W. HARPER.